UNITED STATES PATENT OFFICE.

WILHELM MAJERT, OF BERLIN, GERMANY.

PROCESS OF PRODUCING POWDERED METALLIC TUNGSTEN OR OTHER HEXAVALENT HIGH-FUSING-POINT METALS.

946,551.  Specification of Letters Patent.  Patented Jan. 18, 1910.

No Drawing.   Application filed April 15, 1909.  Serial No. 490,145.

*To all whom it may concern:*

Be it known that I, WILHELM MAJERT, a subject of the German Emperor, and resident of Berlin, Germany, have made certain new and useful Inventions Relating to Processes of Producing Powdered Metallic Tungsten or other Hexavalent High-Fusing-Point Metal.

By using the acid salts of tungstic and molybdic acid or the unsaturated salts of their addition products with phosphoric or boracic acids as for instance, phosphoric molybdic acid, boracic tungstic acid and tungstic boracic acid, from which the metals are reduced, much more finely divided metallic products are obtained which are for that reason much more suitable for the manufacture of filaments for incandescent lamps, and so forth. These lamps may be reduced by heating them red hot and conducting hydrogen over them or they may be heated with oxygen or with zinc dust producing the finely divided tungsten or molybdenum in the form of a dense powder, together with the incorporated tungstate, molybdate or phosphate. Suitable salts for this purpose are sodium paratungstate ($Na_2W_2O_7$) or sodium paramolybdate ($Na_2Mo_2O_7$) from which one molecule of tungsten or molybdenum may be reduced by the method indicated leaving in the residue the neutral salts sodium tungstate($Na_2WO_4$) or sodium molybdate ($Na_2MoO_4$). This process may be carried out as indicated in the following illustrative example. 500 parts by weight of the finely powdered anhydrous sodium paratungstate may be carefully mixed with 35 parts by weight of lamp black or other suitable finely divided carbon and heated to redness in a slowly revolving retort of wrought iron or other suitable material until carbon-dioxid begins to escape. Thereupon hydrogen, water gas or methyl alcohol vapor is admitted until complete reduction is effected. The mass is then cooled slightly while a constant stream of reducing gases or vapors are admitted and then the sodium tungstate residue is washed with slightly alkaline water and then alternately with water acidulated with hydrochloric or sulfuric acid and then with pure water until a neutral reaction occurs, this treatment being continued of course, until the sodium tungstate is eliminated from the residue. The metallic tungsten residue is then washed in methyl or ethyl alcohol and then with benzol and with the lightest benzin, portions of which are allowed to remain incorporated with the residue, producing a plastic mass which may be kept in tightly closed receptacles until it is desired to utilize the same. It is inadvisable to dry the water-moistened metallic powder which readily oxidizes in the air, oxidation also occurring when the water has not been completely displaced by the alcohol used in the subsequent washing. It is of course understood that the sodium tungstate in the first wash waters from the residue may be reconverted into the acid salt used in this process by combining the same with the proper amount of dissolved tungstic acid.

Having described this invention in connection with a number of illustrative ingredients, proportions and methods of preparation, to the details of which disclosure the invention is not of course to be limited, what is claimed as new and what is desired to be secured by Letters Patent is set forth in the appended claims.

1. The process of producing powdered metallic tungsten for incandescent filaments which consists in incorporating approximately five hundred parts by weight of finely powdered anhydrous sodium paratungstate with thirty-five parts of lamp black, in agitating and heating the same in an atmosphere of reducing gas comprising hydrogen to form metallic tungsten and incorporated tungstate and in dissolving out the sodium tugnstate.

2. The process of producing powdered tungsten for incandescent filaments which consists in incorporating finely divided anhydrous sodium paratungstate with powdered carbonaceous reducing material, in agitating and heating the mixture in an atmosphere of reducing gas comprising hydrogen to form metallic tungsten and incorporated sodium tungstate and eliminating the sodium tungstate.

3. The process of producing powdered metallic tungsten which consists in incorporating finely divided paratungstate of an alkali with reducing material, in heating the same in a reducing atmosphere to form metallic tungsten and incorporated tungstate and in eliminating the incorporated tungstate.

4. The process of producing powdered metallic tungsten which consists in reducing paratungstate of a base to form metallic tungsten and incorporated tungstate and in eliminating the incorporated tungstate.

5. The process of producing powdered metallic tungsten which consists in reducing compound tungstic salts to form metallic tungsten and incorporated tungstate and in eliminating the incorporated tungstate.

6. The process of producing powdered high fusing point hexavalent metal for incandescent filaments and the like which consists in reducing alkali para salts of the metal to form the powdered metal and incorporated residual salt and in eliminating the incorporated residual salt.

7. The process of producing powdered high fusing point hexavalent metal which consists in reducing a compound salt of the metal to form the powdered metal and incorporated residual salt and in eliminating the residual salt.

WILHELM MAJERT.

Witnesses:
HARRY L. DUNCAN.
JESSIE B. KAY.